United States Patent [19]
Jacob

[11] Patent Number: 5,882,254
[45] Date of Patent: Mar. 16, 1999

[54] LABORATORY FUME HOOD CONTROLLER UTILIZING OBJECT DETECTION

[75] Inventor: Steven D. Jacob, Crystal Lake, Ill.

[73] Assignee: Siemens Building Technologies, Inc., Buffalo Grove, Ill.

[21] Appl. No.: 871,112

[22] Filed: Jun. 9, 1997

[51] Int. Cl.⁶ .................................................. B08B 15/02
[52] U.S. Cl. .............................................. 454/61; 454/56
[58] Field of Search ................................. 454/49, 56, 58, 454/59, 61, 62

[56] References Cited

U.S. PATENT DOCUMENTS

| | | | |
|---|---|---|---|
| 4,466,341 | 8/1984 | Grogan | 454/61 |
| 4,744,305 | 5/1988 | Lim et al. | 454/49 X |
| 4,893,551 | 1/1990 | Sharp et al. | |
| 4,982,605 | 1/1991 | Oram et al. | |
| 5,090,303 | 2/1992 | Ahmed | |
| 5,240,455 | 8/1993 | Sharp | |
| 5,406,073 | 4/1995 | Sharp et al. | 454/56 X |

*Primary Examiner*—Harold Joyce
*Attorney, Agent, or Firm*—Greer, Burns & Crain, Ltd.

[57] ABSTRACT

A fume hood controller includes detection apparatus for detecting the presence of objects within the fume hood and reduces the flow through the fume hood if there are no objects within the hood, thereby conserving energy costs associated with conditioning supply air to the room where the fume hood is located. The controller also adjusts flow as a function of the presence and also the location of objects that are detected within the fume hood. Since there is a smaller likelihood of fume spillage when the objects are located more deeply within the fume hood, the flow can be reduced in such a situation compared to that which would be required if the objects are located closer to the sash.

15 Claims, 10 Drawing Sheets

LABORATORY FUME HOOD CONTROLLER UTILIZING OBJECT DETECTION

The present invention relates generally to the control of the ventilation of laboratory fume hoods, and more particularly to an apparatus for determining the presence and location of objects in a laboratory fume hood, and for controlling the flow of air through the fume hood as a function of the determined presence and location of such objects.

Fume hoods are utilized in various laboratory environments for providing a work place where potentially dangerous chemicals are used, with the hoods comprising an enclosure having moveable doors at the front portion thereof which can be opened in various amounts to permit a person to gain access to the interior of the enclosure to conduct experiments and the like. The enclosure is typically connected to an exhaust system for removing any noxious fumes so that the person will not be exposed to them while performing work in the hood. The sash doors of such fume hoods are designed to be opened either vertically or horizontally, and the position of the doors is often referred to as the sash position.

Fume hood controllers which control the flow of air through the enclosure have become more sophisticated in recent years, and are now able to more accurately maintain the desired flow characteristics to efficiently exhaust the fumes from the enclosure as a function of the desired average face velocity of the opening of the fume hood. The average face velocity is generally defined as the flow of air into the fume hood per square foot of open face area of the fume hood, with the size of the open face area being dependent upon the position of one or more of the sash doors (often referred to only as a "sash") and in most types of enclosures, the amount of bypass opening that is provided when the door or doors are closed.

The fume hoods are exhausted by an exhaust system that includes a blower that is often capable of being driven at variable speeds to increase or decrease the flow of air from the fume hood to compensate for the varying size of the opening or face. Alternatively, there may be a single blower that may or may not be of the type which can be driven at variable speeds connected to the exhaust manifold that is in turn connected to the individual ducts of multiple fume hoods, and dampers may be provided in the individual ducts to control the flow from the individual ducts to thereby modulate the flow to maintain the desired average face velocity.

To provide adequate safety in laboratories having such fume hoods, it is necessary to exhaust a minimum flow air from the interior of the fume hoods which necessarily involves substantial volumes of air. Of course, this air comes from the rooms where the fume hoods are located, and the air is typically at a relatively comfortable temperature since people are working in the laboratories. Depending on the climatic conditions, the return air supplied to the laboratories is generally outside air that must be heated or cooled, and there are significant costs associated with such temperature conditioning.

There has been a greater awareness in recent years of the significant energy costs that are experienced by the owners of buildings that have laboratory fume hood installations, and improvements have been made in the design and operation of fume hood controllers, and in laboratory room controllers to reduce the operating costs relating to the energy requirements of the laboratory, without sacrificing the safety of the people working in them.

Among the improvements that have been made are the use of sensing devices which are used to detect the presence or absence of individuals in the laboratory room and to lower the volume of flow of air that is exhausted through the fume hoods when people are not present in the laboratory room. This has been accomplished by sensing the presence of individuals in the laboratory room using motion detectors of various kinds. Other techniques sense whether the lights of the room are on, and assume that no one is present if the lights are off. The presumed absence of individuals in the room is used to trigger a setback of flow through the hoods, which necessarily reduces the volume of supply air needed and reduces the energy costs to condition the supply air. The amount of the setback varies with the user, but can approach 50 to 60% of the normal flow for a given face velocity.

While the above techniques are effective to reduce the amount of flow based on the detection of a condition that involves the presence of individuals in the room, it does not deal with other conditions within the fume hood itself, which could be advantageously used to conserve energy costs associated with the operation of such fume hoods.

Accordingly, it is a primary object of the present invention to provide an improved fume hood controller that can selectively control the flow of air through the fume hood to conserve energy costs by detecting the presence of objects within the fume hood and adjusting the flow accordingly.

It is another important object of the present invention to provide an improved fume hood controller that can selectively control the flow of air through the fume hood to conserve energy costs by detecting the position of objects within the fume hood and adjusting the flow accordingly.

A more detailed object is to provide such an improved controller that is adapted to automatically reduce the flow of air through the fume hood if no objects are detected within the interior of the fume hood, which is indicative that no dangerous fumes are present. An ancillary object is to provide such a controller that would reduce the flow to minimal flow volumes which may be virtually no flow if no objects are detected within the fume hood.

Yet another object is to provide such a controller that includes sensing means that are positioned in proximity to the fume hood so that the sensing means is adapted to detect the existence of objects within the fume hood.

Still another object is to provide such a controller that includes sensing means that is adapted to detect the position of objects within the fume hood, so that flow levels can be adjusted to provide adequate safety while minimizing flow for the purpose of reducing the attendant costs previously discussed.

These and other objects will become apparent upon reading the following detailed description of the present invention, while referring to the attached drawings, in which.

DETAILED DESCRIPTION

It should be generally understood that a fume hood controller controls the flow of air through the fume hood in a manner whereby the effective size of the total opening to the fume hood, including the portion of the opening that is not covered by one or more sash doors will have a relatively constant average face velocity of air moving into the fume hood. This means that regardless of the area of the uncovered opening, an average volume of air per unit of surface area of the uncovered portion will be moved into the fume hood. This protects the persons in the laboratory from being exposed to noxious fumes or the like because air is always flowing into the fume hood, and out of the exhaust duct, and the flow is preferably controlled at a predetermined rate that can vary, but which is generally within the range of approximately 60 to 150 cubic feet per minute per square foot of effective surface area of the uncovered opening.

Broadly stated, the present invention is directed to a controller for a fume hood where the flow of air through the fume hood is controlled to maintain safe operating conditions and also to reduce the flow when possible to save costs. However, costs are not saved at the expense of safety, which is of paramount importance. The controller includes sensing means for sensing whether objects are in the fume hood and the controller is adapted to control the flow of air through the fume hood as a function of the presence or absence of objects in the fume hood as well as the position of the objects, if present. The controller is thereby able to reduce the flow of air through the fume hood to a minimum acceptable flow if no objects exist in the fume hood, which is presumed to indicate that there are no noxious fumes present. The controller is also adapted to control the flow as a function of the location of objects within the fume hood. In this regard, it is known that the likelihood of fumes spilling out through the opening of the fume hood is increased the closer the source of the fumes is to the opening. Thus, if a beaker containing chemicals or the like which emit dangerous fumes is located near the back of the interior of the fume hood, the likelihood that fumes would escape from the front is reduced. That being the case, the flow through the fume hood can be reduced to some degree without compromising safety, while still realizing the cost savings associated with less flow.

Figure 1:
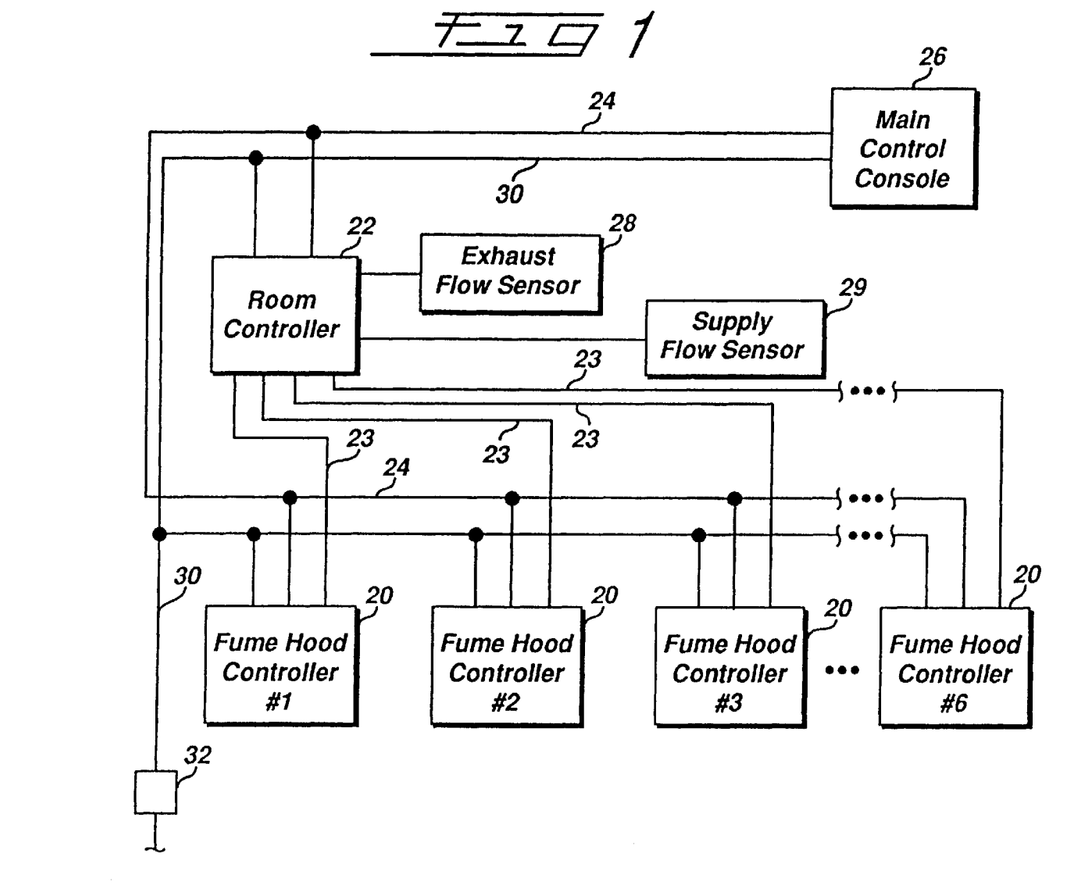
FIG. 1 is a schematic block diagram of apparatus of the present invention shown integrated with a room controller of a heating, ventilating and air conditioning monitoring and control system of a building.

Turning now to the drawings, and particularly FIG. 1, a block diagram is shown of several fume hood controllers 20 interconnected with a room controller 22, and a main control console 26. The room controller 22 is also connected to an exhaust flow sensor 28 and a supply flow sensor 29. The fume hood controllers 20 are interconnected with the room controller 22 and the main control console 26 in a local area network illustrated by line 24 which may be a multi-conductor cable or the like. The room controller and the main control console 26 are typically part of the building main HVAC system in which the laboratory rooms containing the fume hoods are located. The fume hood controllers 20 are provided with power through line 30, which is at the proper voltage via a transformer 32 or the like.

The room controller 22 preferably is of the type which is at least capable of providing a variable air volume to the room, and may be a Landis & Staefa, Inc. System 600 SCU controller. The room controller 22 is capable of communicating over the LAN lines 24. The room controller is a commercially available controller for which extensive documentation exists. The User Reference Manual, Part No. 125-1753 for the System 600 SCU controller is specifically incorporated by reference herein.

The room controller 22 receives signals via lines 23 from each of the fume hood controllers 20 that provides an analog input signal indicating the volume of air that is being exhausted by each of the fume hood controllers 20 and a comparable signal from the exhaust flow sensor that provides an indication of the volume of air that is being exhausted through the main exhaust system apart from the fume hood exhausts.

Figure 2:
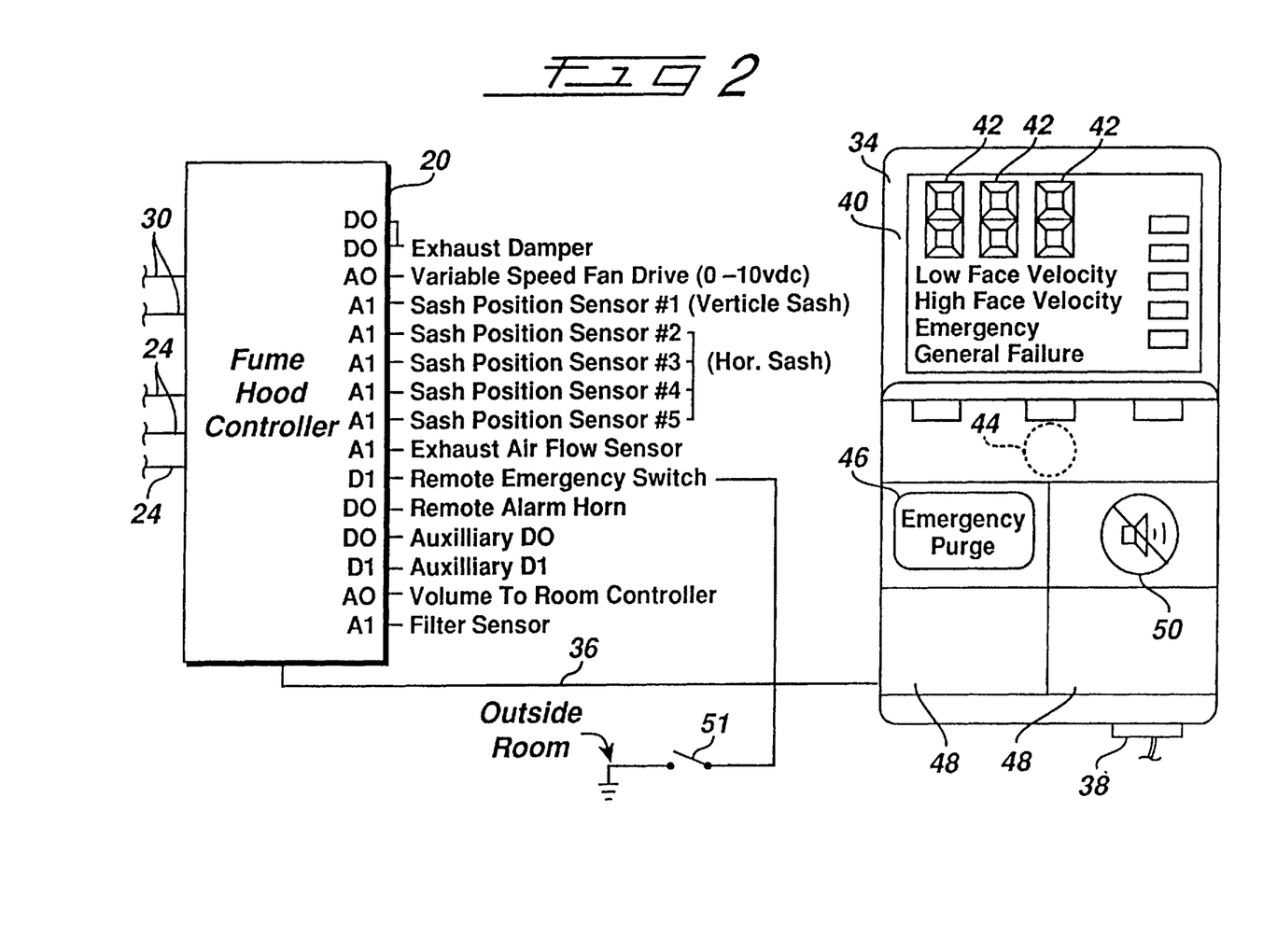
FIG. 2 is a block diagram of a fume hood controller, shown connected to an operator panel, the latter being shown in front elevation.

Referring to FIG. 2, a fume hood controller 20 is illustrated with its input and output connector ports being identified, and the fume hood controller 20 is connected to an operator panel 34. It should be understood that each fume hood will have a fume hood controller 20 and that an operator panel will be provided with each fume hood controller. The operator panel 34 is provided for each of the fume hoods and it is interconnected with the fume hood controller 20 by a line 36 which preferably comprises a multi-conductor cable having eight conductors. The operator panel has a connector 38, such as a 6 wire RJ11 type telephone jack for example, into which a lap top personal computer or the like may be connected for the purpose of inputting information relating to the configuration or operation of the fume hood during initial installation, or to change certain operating parameters if necessary. The operator panel 34 is preferably mounted to the fume hood in a convenient location adapted to be easily observed by a person who is working with the fume hood.

The fume hood controller operator panel 34 preferably includes a liquid crystal display 40, which when selectively activated, provides the visual indication of various aspects of the operation of the fume hood, including three digits 42 which provide the average face velocity. The display 40 illustrates other conditions such as low face velocity, high face velocity and emergency condition and an indication of controller failure. The operator panel may have an audible alarm 44 and an emergency purge switch 46 which an operator can press to purge the fume hood in the event of an accident. The operator panel has two auxiliary switches 48 which can be used for various customer needs, including day/night modes of operation. It is contemplated that night time mode of operation would have a different and preferably reduced average face velocity, presumably because no one would be working in the area and such a lower average face velocity would conserve energy. An alarm silence switch 50 is also preferably provided to extinguish an alarm.

Fume hoods come in many different styles, sizes and configurations, including those which have a single sash door or a number of sash doors, with the sash doors being moveable vertically, horizontally or in both directions.

Figure 3:
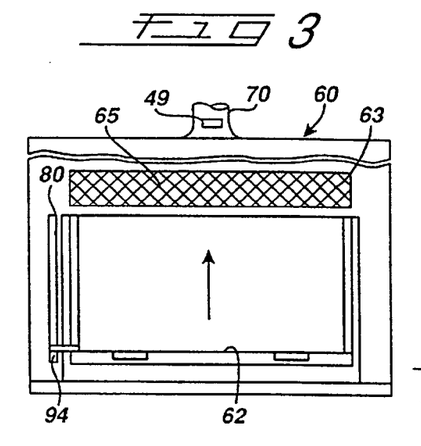
FIG. 3 is a diagrammatic elevation of the front of a representative fume hood having a vertically operable sash door, and a by-pass opening located above the front face.

Referring to FIG. 3, there is shown a fume hood, indicated generally at 60, which has a vertically operated sash door 62 which can be moved to gain access to the fume hood and which can be moved to the substantially closed position as shown. Fume hoods are generally door sash o that even when a door sash such as door sash 62 is completely closed, there is still some amount of opening into the fume hood, such as opening 63, through which air can pass. This opening 63 is generally referred to as the by-pass area and it can be determined so that its effect can be taken into consideration in controlling the flow of air into the fume hood. Some types of fume hoods have a by-pass opening that is located above the door sash while others are below it. In some fume hoods, the first amount of movement of a sash door will increase the opening at the bottom of the door shown in FIG. 3, for example, but as the door is raised, it will merely cut off the by-pass opening so that the size of the total opening of the fume hood is maintained relatively constant for perhaps the first one-fourth amount of movement of the sash door 62 through its course of travel and ignoring any effect of a grille 65 which is provided to overlie the by-pass area.

Figure 4:
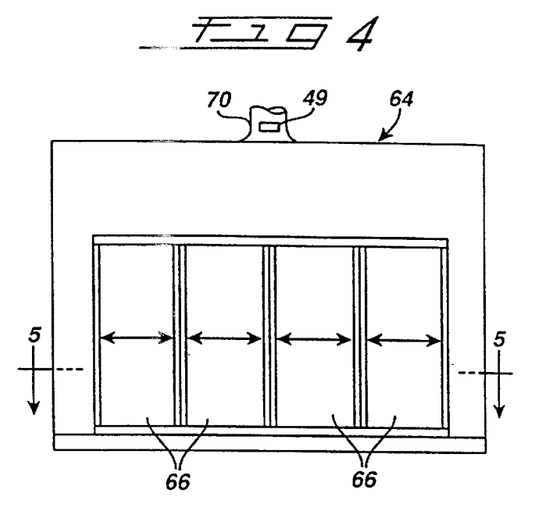
FIG. 4 is a diagrammatic elevation of the front of a representative fume hood having horizontally operable sash doors.
Figure 5:
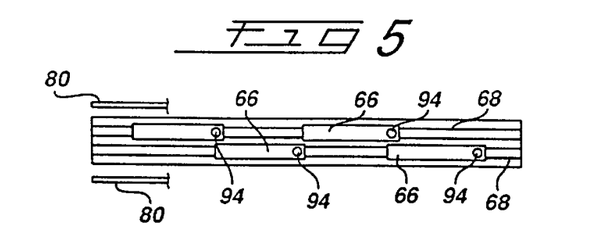
FIG. 5 is a cross section taken generally along the line 5—5 of FIG. 4.

Other types of fume hoods may include several horizontally moveable sash doors 66 such as shown in FIGS. 4 and 5, with the doors being movable in upper and lower pairs of adjacent tracks 68. When the doors are positioned as shown in FIGS. 4 and 5, the fume hood opening is completely closed and an operator may move the doors in the horizontal direction to gain access to the fume hood. Both of the fumes hoods 60 and 64 have an exhaust duct 70 which generally extends to an exhaust system which may be that of the HVAC apparatus previously described.

While not specifically illustrated, other combinations are also possible, including multiple sets of vertically moveable sash doors positioned adjacent one another along the width of the fume hood opening, with two or more sash doors being vertically moveable in adjacent tracks, much the same as residential casement windows.

In accordance with an important aspect of the fume hood controller 20, it is adapted to operate the fume hoods of various sizes and configurations as has been described, and it is also adapted to be incorporated into a laboratory room where several fume hoods may be located and which may have exhaust ducts which merge into a common exhaust manifold which may be a part of the building HVAC system. A fume hood may be a single self-contained installation and may have its own separate exhaust duct. In the event that a single fume hood is installed, it is typical that such an installation would have a variable speed motor driven blower associated with the exhaust duct whereby the speed of the motor and blower can be variably controlled to thereby adjust the flow of air through the fume hood. Alternatively, and most typically for multiple fume hoods in a single area, the exhaust ducts of each fume hood are merged into one or more larger exhaust manifolds and a single large blower may be provided in the manifold system. In such types of installations, control of each fume hood is achieved by means of separate dampers located in the exhaust duct of each fume hood, so that variation in the flow can be controlled by appropriately positioning the damper associated with each fume hood.

The fume hood controller is adapted to control virtually any of the various kinds and styles of fume hoods that are commercially available, and to this end, it has a number of input and output ports (lines, connectors or connections, all considered to be equivalent herein) that can be connected to various sensors that may be used with the controller. As shown in FIG. 2, it has digital output or DO ports which interface with a digital signal/analog pressure transducer with an exhaust damper as previously described, but it also has an analog voltage output port for controlling a variable speed fan drive if it is to be installed in that manner. There are five sash position sensor ports for use in sensing the position of both horizontally and vertically moveable sashes and there is also an analog input port provided for connection to an exhaust air flow sensor 49. A digital input port for the emergency switch is provided and digital output ports for outputting an alarm horn signal as well as an auxiliary signal is provided. An analog voltage output port is also provided for providing a volume of flow signal to the room controller 22. In certain applications where the exhaust air flow sensor is not provided, a wall velocity sensor indicative of face velocity may be utilized and an input port for such a signal is provided, but the use of such sensors is generally considered to be less accurate and is not the preferred embodiment. With these various input and output ports, virtually any type of fume hood can be controlled in an effective and efficient manner.

Figure 7:
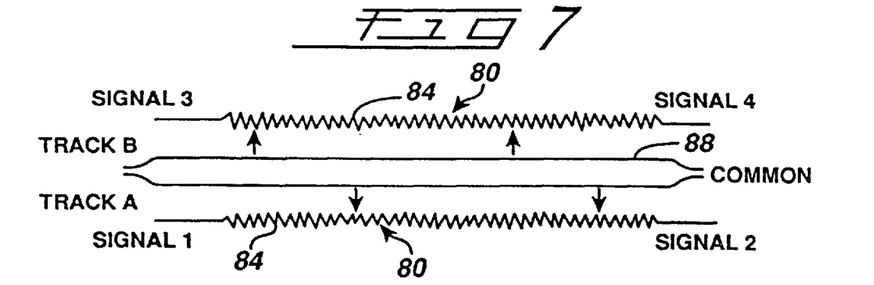
FIG. 7 is an electrical schematic diagram of a plurality of door sash position indicating switching means.
Figure 8:
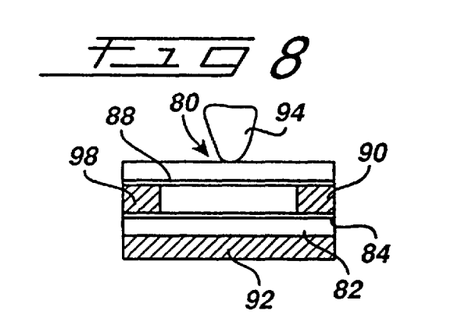
FIG. 8 is a cross section of the door sash position switching means.
Figure 9:
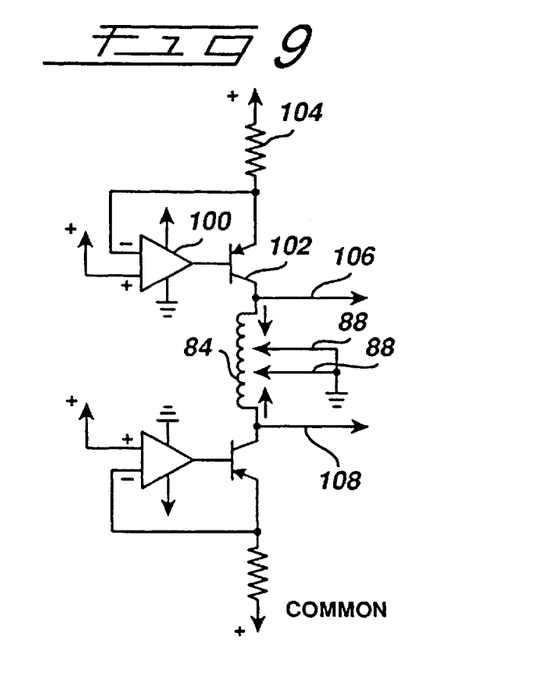
FIG. 9 is a schematic diagram of electrical circuitry for determining the position of sash doors of a fume hood.

To determine the position of the sash doors, a sash position sensor is provided adjacent each movable sash door and it is generally illustrated in FIGS. 7, 8 and 9. Referring to FIG. 8, the door sash position sensor comprises an elongated switch mechanism 80 of relatively simple mechanical design which preferably consists of a relatively thin polyester base layer 82 upon which is printed a strip of electrically resistive ink 84 of a known constant resistance per unit length. Another polyester base layer 86 is provided and it has a strip of electrically conductive ink 88 printed on it. The two base layers 82 and 86 are adhesively bonded to one another by two beads of adhesive 90 located on opposite sides of the strip. The base layers are preferably approximately five-thousandths of an inch thick and the beads are approximately two-thousandths of an inch thick, with the beads providing a spaced area between the conductive and resistive layers 88 and 84. The switching mechanism 80 is preferably applied to the fume hood by a layer of adhesive 92.

The polyester material is sufficiently flexible to enable one layer to be moved toward the other so that contact is made in response to a preferably spring biased actuator 94 carried by the appropriate sash door to which the strip is placed adjacent to so that when the sash door is moved, the actuator 94 moves along the switching mechanism 80 and provides contact between the resistive and conductive layers which are then sensed by electrical circuitry to be described which provides a voltage output that is indicative of the position of the actuator 94 along the length of the switching means. Stated in other words, the actuator 94 is carried by the door and therefore provides an electrical voltage that is indicative of the position of the sash door.

The actuator 94 is preferably spring biased toward the switching mechanism 80 so that as the door is moved, sufficient pressure is applied to the switching means to bring the two base layers together so that the resistive and conductive layers make electrical contact with one another and if this is done, the voltage level is provided. By having the switching means 80 of sufficient length so that the full extent of the travel of the sash door is provided as shown in FIG. 3, then an accurate determination of the sash position can be made.

It should be understood that the illustration of the switching mechanism 80 in FIGS. 3 and 5 is intended to be diagrammatic, in that the switching mechanism is preferably actually located within the sash frame itself and accordingly would not be visible as shown. The width and thickness dimensions of the switching mechanism are so small that there is little interference with the operation of the sash door. The actuator 94 can also be placed in a small hole that may be drilled in the sash door or it may be attached externally at one end thereof so that it can be in position to operate the switch 80. In the vertical moveable sash doors shown in FIGS. 3 and 6, a switching mechanism 80 is preferably provided in one or the other of the sides of the sash frame, whereas in the fume hoods having horizontally movable doors, it is preferred that the switching mechanism 80 be placed in the top of the tracks 68 so that the weight of the movable doors do not operate the switching mechanism 80 or otherwise damage the same.

Turning to FIG. 9, the preferred electrical circuitry which generates the position indicating voltage is illustrated, and this circuitry is adapted to provide two separate voltages indicating the position of two sash doors in a single track. With respect to the cross-section shown in FIG. 5, there are two horizontal tracks, each of which carries two sash doors and a switching mechanism 80 is provided for each of the tracks as is a circuit as shown in FIG. 9, thereby providing a distinct voltage for each of the four sash doors as shown.

The switching means is preferably applied to the fume hood with a layer of adhesive 92 and the actuator 94 is adapted to bear upon the switching means at locations along the length thereof. Referring to FIG. 7, a diagrammatic illustration of a pair of switching means is illustrated such as may occur with respect to the two tracks shown in FIG. 5. A switching mechanism 80 is provided with each track and the four arrows illustrated represent the point of contact created by the actuators 94 which result in a signal being applied on each of the ends of each switching means, with the magnitude of the signal representing a voltage that is proportional to the distance between the end and the nearest arrow. Thus, a single switching mechanism 80 is adapted to provide position indicating signals for two doors located in each track. The circuitry that is used to accomplish the voltage generation is shown in FIG. 9 and includes one of these circuits for each track. The resistive element is shown at 84 and the conductive element 88 is also illustrated being connected to ground with two arrows being illustrated, and represented the point of contact between the resistive and conductive elements caused by each of the actuators 94 associated with the two separate doors. The circuitry includes an operational amplifier 100 which has its output connected to the base of a PNP transistor 102, the emitter of which is connected to a source of positive voltage through resistor 104 into the negative input of the operational amplifier, the positive input of which is also connected to a source of positive voltage of preferably approximately five volts. The collector of the transistor 102 is connected to one end of the resistive element 84 and has an output line 106 on which the voltage is produced that is indicative of the position of the door.

The circuit operates to provide a constant current directed into the resistive element 84 and this current results in a voltage on line 106 that is proportional to the resistance value between the collector and ground which changes as the nearest point of contact along the resistance changes. The operational amplifier operates to attempt to drive the negative input to equal the voltage level on the positive input and this results in the current applied at the output of the operational amplifier varying in direct proportion to the effective length of the resistance strip 84. The lower portion of the circuitry operates the same way as that which has been described and it similarly produces a voltage on an output line 108 that is proportional to the distance between the connected end of the resistance element 84 and the point of contact that is made by the actuator 94 associated with the other sash door in the track.

Figures 10, 10B:
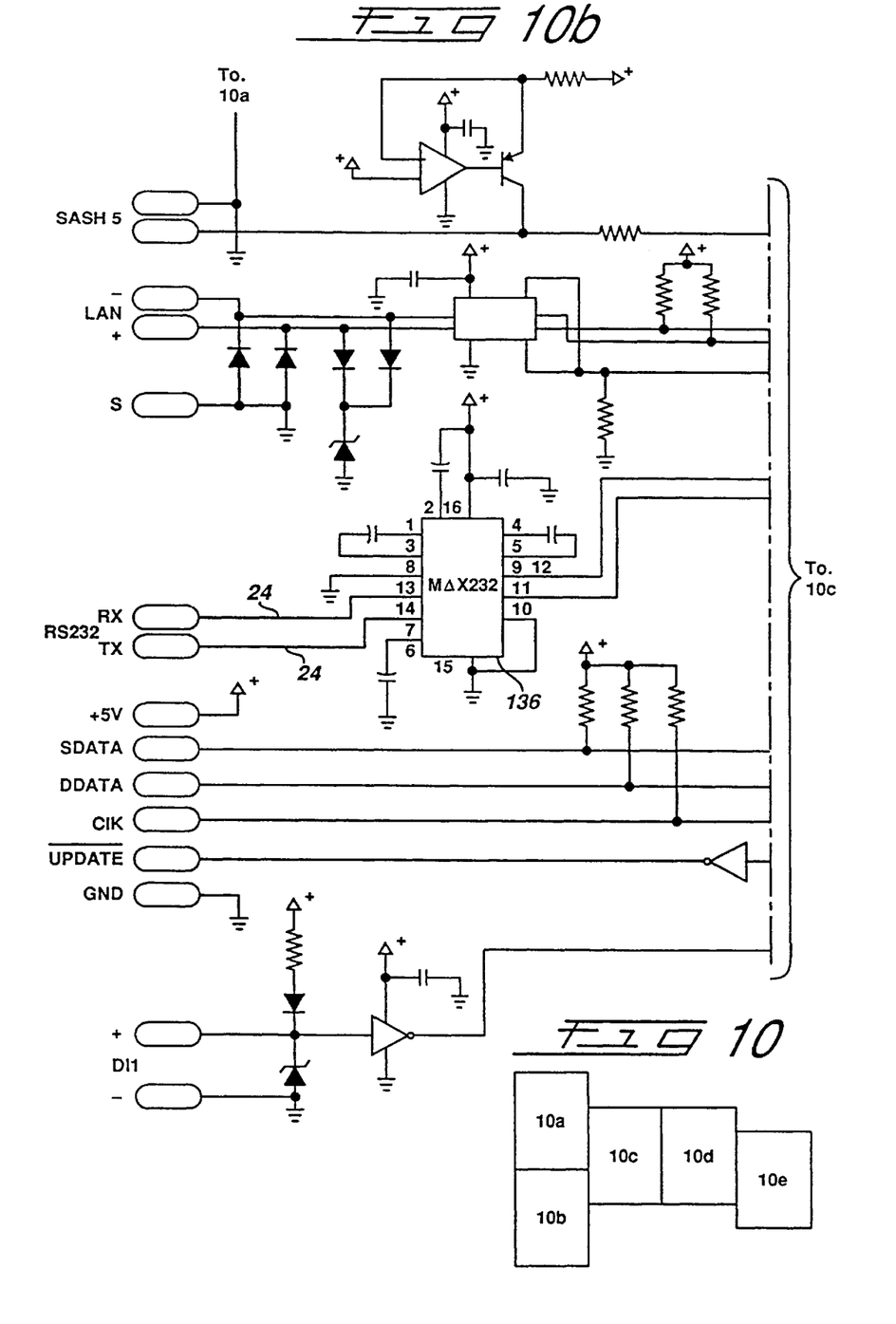
FIG. 10 is a block diagram illustrating the relative positions of FIGS. 10a, 10b, 10c, 10d and 10e to one another, and which together comprise a schematic diagram of the electrical circuitry for the fume hood controller means embodying the present invention.
FIGS. 10a, 10b, 10c, 10d and 10e, which when connected together, comprise a schematic diagram of the electrical circuitry for the fume hood controller means embodying the present invention.
Figure 10A:
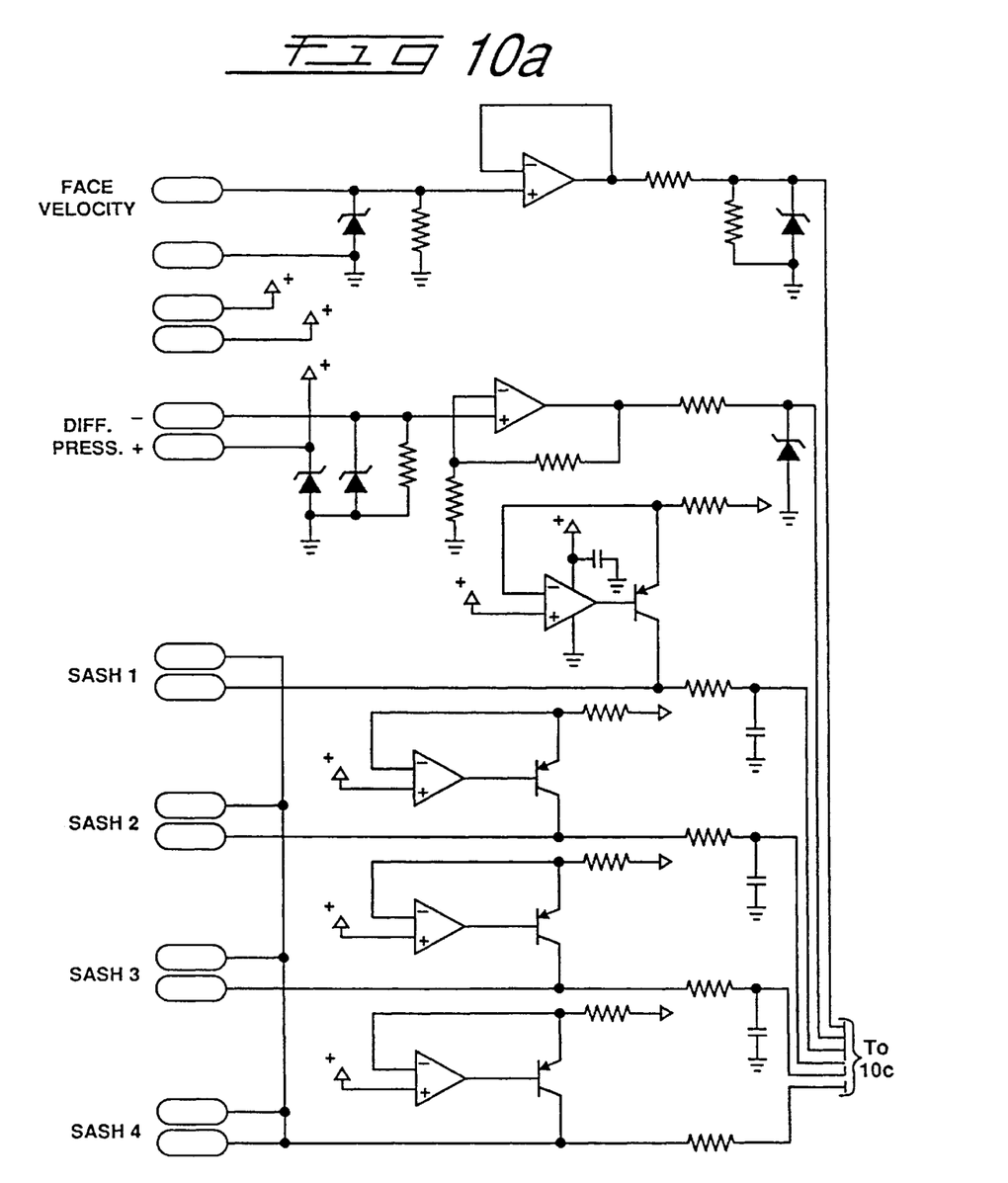
Figure 10C:
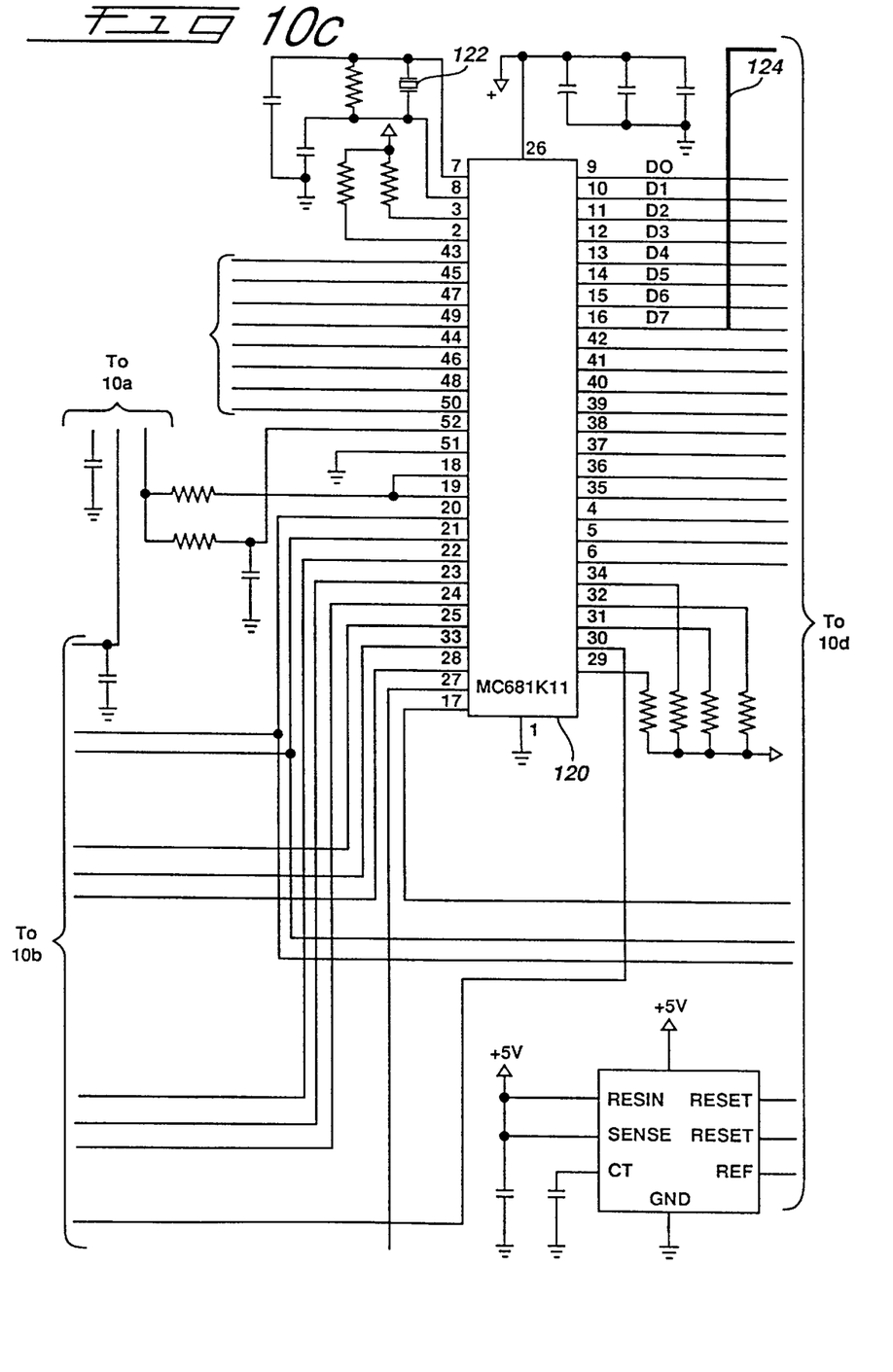
Figure 10D:
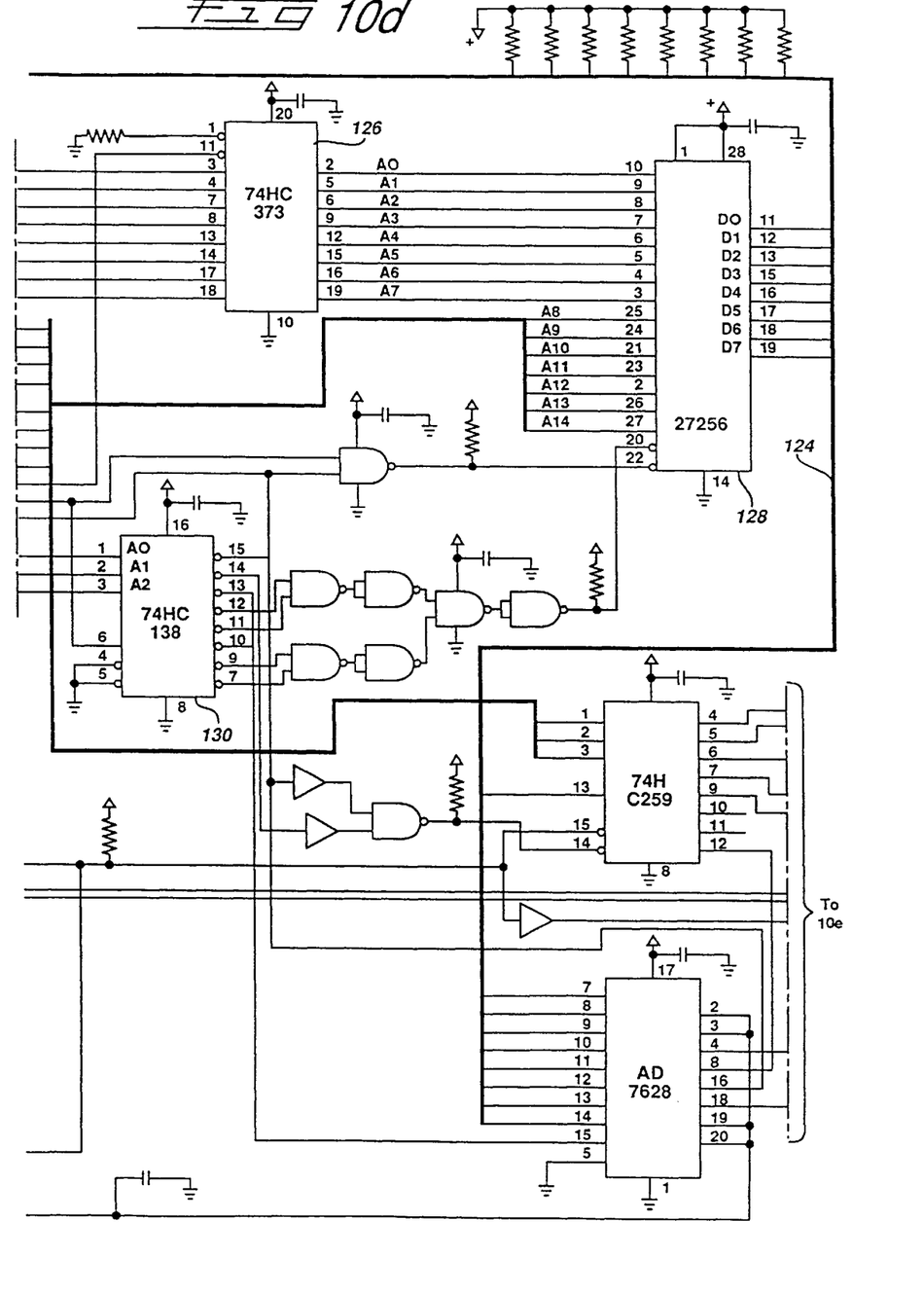
Figure 10E:
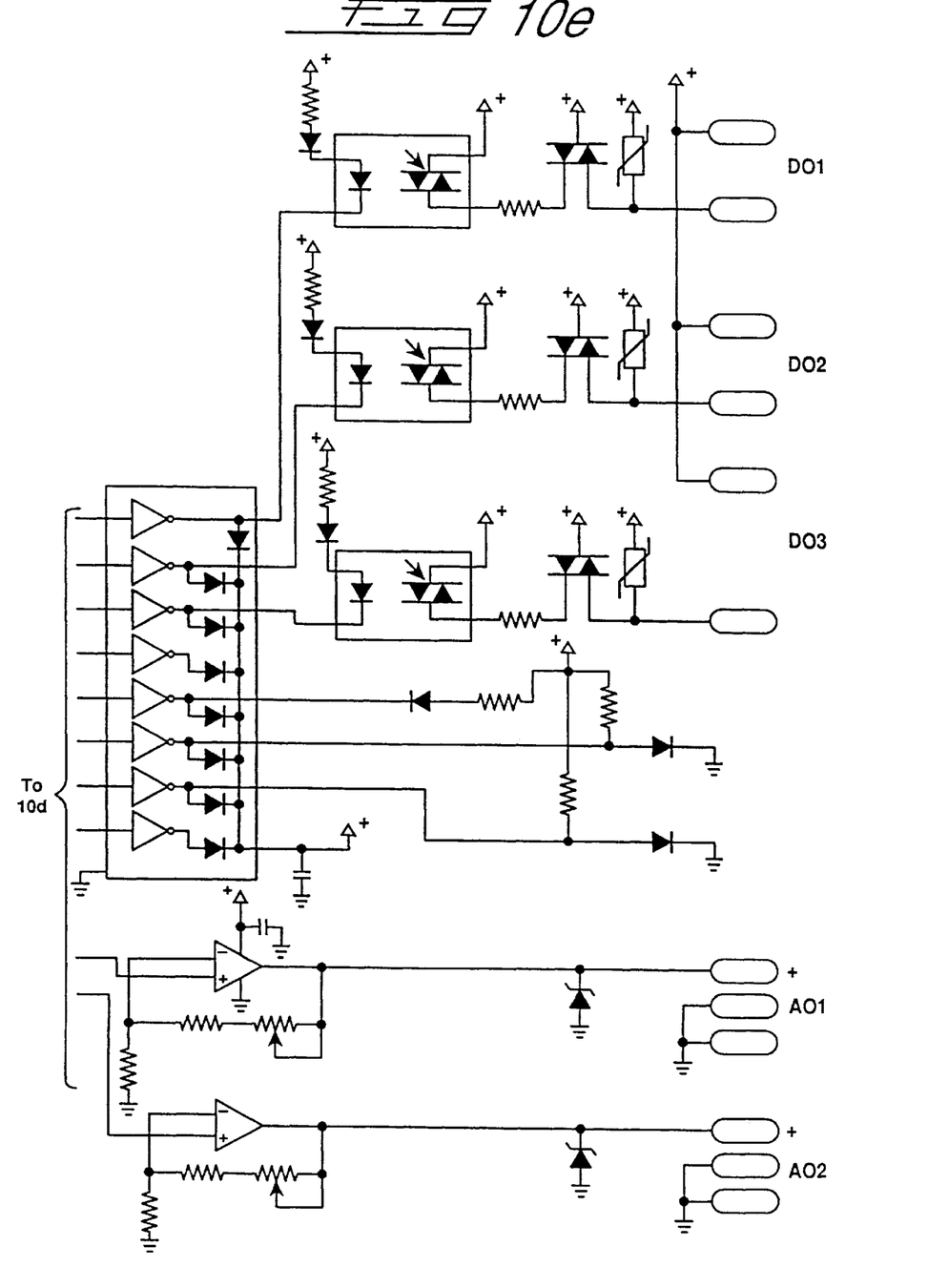

Referring to the composite electrical schematic diagram of the circuitry of the fume hood controller, if the separate drawings FIGS. 10a, 10b, 10c, 10d and 10e are placed adjacent one another in the manner shown in FIG. 10, the total electrical schematic diagram of the fume hood controller 20 is illustrated. The operation of the circuitry of FIGS. 10a through 10e will not be described in detail. The circuitry is driven by a microprocessor and the important algorithms that carry out the control functions of the controller will be hereinafter described. Referring to FIG. 10c, the circuitry includes a Motorola MC 68HC11 microprocessor 120 which is clocked at 8 MHz by a crystal 122. The microprocessor 120 has a databus 124 that is connected to a tri-state buffer 126 (FIG. 10d) which in turn is connected to an electrically programmable read only memory 128 that is also connected to the databus 124. The EPROM 128 has address lines A0 through A7 connected to the tri-state buffer 126 and also has address lines A8 through A14 connected to the microprocessor 120.

The circuitry includes a 3 to 8-bit multiplexer 130, a data latch 132 (see FIG. 10d), a digital-to-analog converter 134, which is adapted to provide the analog outputs indicative of the volume of air being exhausted by the fume hood, which information is provided to room controller 22 as has been previously described with transmitting and receiving information through the hand held terminal. The circuitry illustrated in FIG. 9 is also shown in the overall schematic diagrams and is in FIGS. 10a and 10b. The other components are well known and therefore need not be otherwise described.

Figure 6:
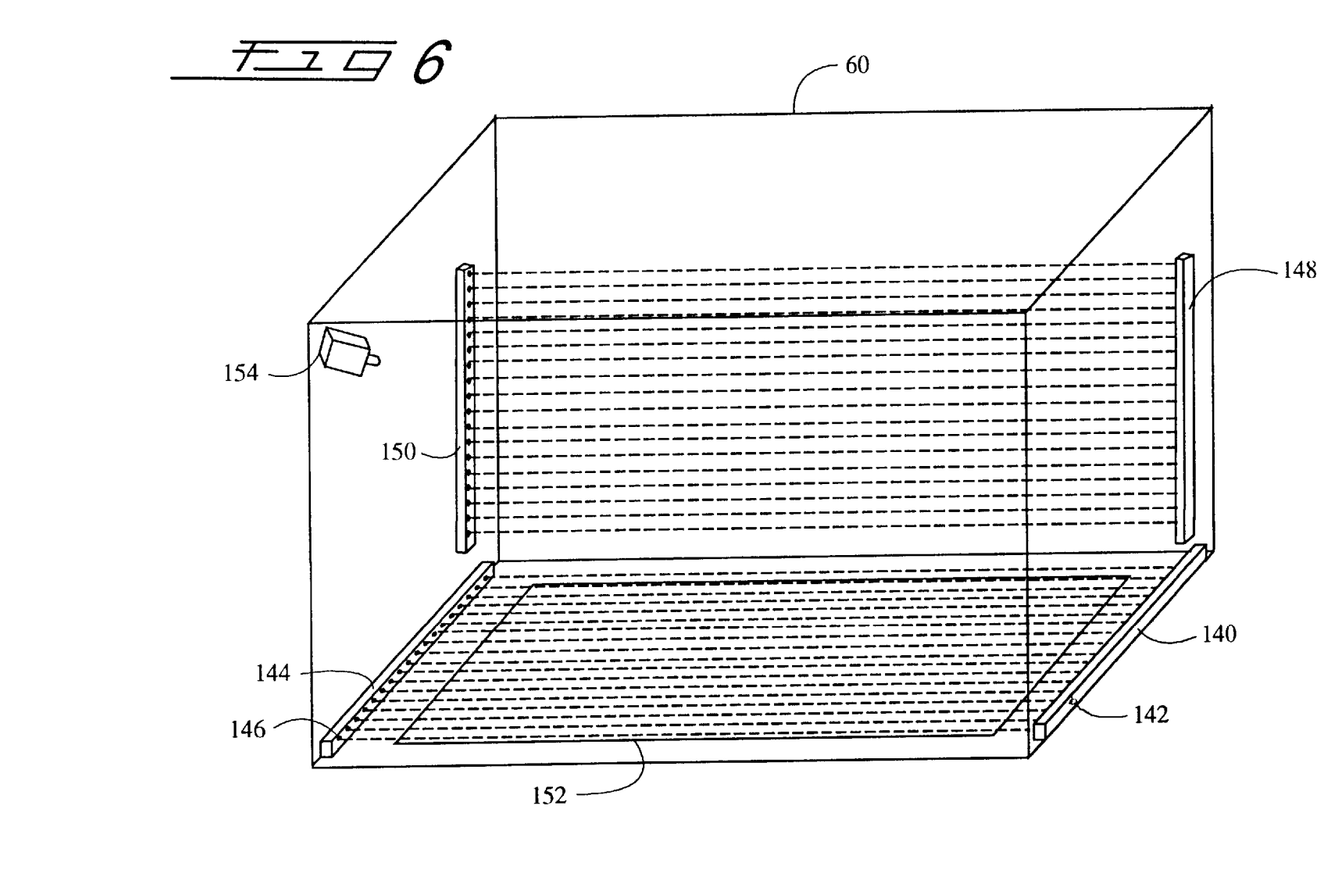
FIG. 6 is a diagrammatic isometric view of the front of a fume hood having object sensing means embodying the present invention.

In accordance with an important aspect of the present invention, and referring to FIG. 6, the interior of the fume hood has sensing means, which in the preferred embodiment, includes at least a light producing strip 140 located on one side of the interior of the fume hood 60 that have a plurality of light emitting devices 142 each of which is adapted to emit light along a discrete path along the floor of the fume hood 60, which can be detected by a light detecting strip 144 located on the opposite side of the fume hood. The detecting strip 144 preferably has a plurality of light detecting devices 146, such as phototransistors that are adapted to detect the presence of an object in between the detector and the light producing strip along a particular path. In this regard, the light producing strip preferably comprises a plurality of light producing devices, such as light emitting diodes that are directed toward specific detectors 146 in the detecting strip 144. Thus, each of the plurality of light producing devices 142 is associated with one of the light detecting devices 146 to define a light circuit which is adapted to detect the presence or absence of an object along the path of the light. The light detecting devices 146 are preferably identified so that if an object is present in the fume hood, and one or more light circuits is broken, the distance the object is located from the front of the fume hood can be determined. Such determination of the location of objects can be used by the controller to control the flow of air through the fume hood.

In keeping with the present invention, a vertically oriented light producing strip 148 and a vertically oriented light detecting strip 150 may be provided, with each being located within approximately 2 to 4 inches from the back wall of the fume hood 60. These strips operate in substantially the same way as the strips 140 and 144, but are positioned to detect objects that may be present on shelves that are commonly present in fume hoods. The light circuits should be positioned slightly above the position of each of the shelves and adapted to detect the presence or absence of even short objects that may be present on the shelves.

Of course, while the preferred embodiment employs light emitting strips and light detecting strips as described, it should be understood that the use of a strip is not necessary, inasmuch as the light emitting devices and light detecting devices may be individually mounted to the walls of the fume hood. Also, the scope of the present invention includes other types of circuits in addition to those described and may include infrared radiation circuits, laser circuits, ultrasonic circuits and other types of circuits. Moreover, the detection of objects on the floor, and even on shelves, could be done by load cells or weight measuring devices such as is diagrammatically shown at 152 in FIG. 6, if desired.

It should also be understood that the scope of the present invention may include a video scanning means such as a CCD camera 154 that may be mounted in or outside of the fume hood, but in either case be adapted to view the inside of the fume hood and acquire and analyze images of the inside of the fume hood. An image of an empty fume hood can be stored and can be used for comparison purposes to determine the existence of any work objects in the fume hood as well as the position of them if they are present. Processing means can then compare the stored image of the empty fume hood with subsequently acquired images and determine if work objects are present in the fume hood.

While control of the air flow through the fume hood can be controlled in a variety of ways, one preferred way is to reduce the flow to a value of approximately 50% of the nominal average face velocity if all objects are within about 2 inches of the back wall of the fume hood, with the nominal face velocity being that which would be used if the objects were within about 6 inches from the front of the fume hood. Control of the face velocity between the 6 inches from the front position to the back can be proportionally scaled. It is also preferred that if a light circuit is interrupted or broken for a location that is closer than 6 inches from the front of the fume hood, that an alarm condition be activated. The alarm can be audio, visual or both.

It is also within the scope of the present invention that if the detecting devices detect the absence of objects in the fume hood, that the controller reduce the air flow to a minimum condition that may be only 10% to 20% of the nominal average face velocity. While conceivably the flow could be reduced to zero, it is preferred that some number of air changes be made, and the 10% to 20% value will accomplish that.

From the foregoing description, it should be appreciated that an improved controller has been shown and described which offers unique control of the flow of air through a fume hood, in that it provides effective safety with respect to the necessary flow of air through the fume hood, while conserving the flow under particular detected conditions. The reduced flow results in economies associated with conditioning replacement air that must be supplied to the room where the fume hoods are located.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for controlling the air flow through a fume hood of the type which has at least one moveable sash door adapted to cover the access opening, the fume hood being in communication with an exhaust duct for expelling air and fumes from the fume hood in an amount that is measured by the average face velocity primarily through the access opening, said apparatus comprising:

means for monitoring the interior of the fume hood and for detecting a work object within the interior of the fume hood and generating a signal that indicates an absence of work objects within the fume hood;

means responsive to said signal for controlling the flow volume of air that is expelled from the fume hood.

2. Apparatus as defined in claim 1 wherein said object monitoring and detecting means comprises a radiation emitting means and a radiation detecting means strategically positioned to form at least one radiation circuit that canvasses the interior of the fume hood, said radiation detecting means being adapted to generate said signal when said radiation circuit is uninterrupted.

3. Apparatus as defined in claim 2 wherein object monitoring and detecting means forms a plurality of radiation circuits that are adapted to detect the presence of work objects and their distance from the access opening.

4. Apparatus as defined in claim 3 wherein said radiation emitting means comprises a light emitting diode.

5. Apparatus as defined in claim 3 wherein said radiation emitting means comprises an infrared radiation producing means.

6. Apparatus as defined in claim 1 wherein said work object monitoring and detecting means comprises a plurality of radiation circuits adapted to detect the presence of work objects located on the bottom of the fume hood, and one or more additional radiation circuits adapted to detect the presence of work objects located on shelves above the bottom of the fume hood.

7. Apparatus as defined in claim 1 wherein said work object monitoring and detecting means comprises a means for detecting the weight of work objects that are present in the fume hood, said work object detecting means generating said signal in response to said weight detecting means detecting a weight above a predetermined threshold.

8. Apparatus as defined in claim 1 wherein said object monitoring and detecting means comprises an ultrasonic beam generating means and an ultrasonic beam detecting means.

9. Apparatus as defined in claim 6 wherein said plurality of radiation circuits are adapted to determine the position of work objects relative to the front of the fume hood and generate signals that are indicative of the position of the work objects relative to the front of the fume hood, said controlling means being adapted to reduce the flow volume of air from a nominal average face velocity to a minimum average face velocity in proportion to the distance of the nearest work object from the front of the fume hood.

10. Apparatus as defined in claim 1 wherein said work object monitoring and detecting means comprises a video camera adapted to capture a first image of the interior of the fume hood with no work objects therein, means for storing said captured first image, and means for controlling said video camera for capturing additional images and comparing said images with said first image to determine the location of any work objects that are present.

11. Apparatus for controlling the air flow through a fume hood of the type which has at least one moveable sash door adapted to cover the access opening, the fume hood being in commnunication with an exhaust duct for expelling air and fumes from the fume hood in an amount that is typically measured in terms of the average face velocity through the access opening, said apparatus comprising:

means for monitoring the interior of the fume hood for the purpose of detecting the presence and location of any work objects within the interior of the fume hood and generating signals that are indicative of the existence of any work objects and the position of existing work objects within the fume hood;

means responsive to said signals for controlling the flow volume of air that is expelled from the fume hood, the flow volume being a function of at least the presence of work objects in the fume hood.

12. Apparatus as defined in claim 11 wherein said controlling means is adapted to reduce the flow volume of air from a nominal average face velocity to a lower average face velocity in proportion to the distance from the front of the fume hood of the nearest work object.

13. Apparatus as defined in claim 12 wherein said lower average face velocity is approximately 50% of the nominal average face velocity, and said nominal average face velocity is within the range of approximately 60 to about 150 cubic feet per minute per square foot of access opening.

14. Apparatus as defined in claim 11 wherein said controlling means is adapted to set the flow volume of air to a minimum average face velocity in the absence of work objects in the fume hood.

15. Apparatus as defined in claim 14 wherein said minimum average face velocity is approximately 20% of said nominal face velocity.

\* \* \* \* \*